(12) United States Patent
Stern

(10) Patent No.: US 10,013,321 B1
(45) Date of Patent: Jul. 3, 2018

(54) EARLY RAID REBUILD TO IMPROVE RELIABILITY

(71) Applicant: EMC IP Holding Company LLC, Hopkinton, MA (US)

(72) Inventor: Richard M Stern, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 15/190,056

(22) Filed: Jun. 22, 2016

(51) Int. Cl.
 *G06F 11/00* (2006.01)
 *G06F 11/20* (2006.01)
 *G06F 3/06* (2006.01)

(52) U.S. Cl.
 CPC .......... *G06F 11/2069* (2013.01); *G06F 3/064* (2013.01); *G06F 3/065* (2013.01); *G06F 3/0619* (2013.01); *G06F 3/0689* (2013.01); *G06F 2201/805* (2013.01); *G06F 2201/86* (2013.01)

(58) Field of Classification Search
 CPC .............. G06F 11/2069; G06F 3/0619; G06F 3/064–3/065; G06F 2211/1004–2211/1095
 See application file for complete search history.

(56) References Cited

U.S. PATENT DOCUMENTS

| | | | | | |
|---|---|---|---|---|---|
| 5,727,144 | A | * | 3/1998 | Brady | G06F 11/004 714/57 |
| 5,828,583 | A | * | 10/1998 | Bush | G06F 11/004 702/185 |
| 5,917,724 | A | * | 6/1999 | Brousseau | G11B 19/04 360/48 |
| 6,982,842 | B2 | * | 1/2006 | Jing | G11B 19/04 324/212 |
| 7,434,097 | B2 | * | 10/2008 | Guha | G06F 11/008 714/6.32 |
| 2004/0260967 | A1 | * | 12/2004 | Guha | G06F 11/008 714/3 |
| 2005/0060618 | A1 | * | 3/2005 | Guha | G06F 11/008 714/54 |
| 2005/0262385 | A1 | * | 11/2005 | McNeill, Jr. | G06F 11/008 714/6.2 |
| 2013/0332780 | A1 | * | 12/2013 | Hikichi | G06F 11/004 714/47.3 |

\* cited by examiner

*Primary Examiner* — Jason B Bryan
(74) *Attorney, Agent, or Firm* — Staniford Tomita LLP

(57) ABSTRACT

A method of minimizing rebuild times within a large-scale data storage system, such as a RAID array by: maintaining a spare disk for a plurality of disks within a disk array; monitoring the plurality of disks for occurrence of one or more pre-failure indicators; maintaining, for each disk, a count of the occurrences of the pre-failure indicators; comparing the count for each disk to a defined threshold value; and copying the first disk and mirroring write operations to the first disk to the spare disk if the count for the first disk exceeds the threshold. The method switches the copying to the spare disk from the first disk to a second disk if the count for the second disk exceeds the count for the first disk. In this manner, certain predictive information can be used to use the spare disk to reduce RAID rebuild times to near instantaneous periods.

16 Claims, 6 Drawing Sheets

EARLY RAID REBUILD TO IMPROVE RELIABILITY

TECHNICAL FIELD

Embodiments are generally directed to large capacity data storage systems, and more specifically to using device failure indicators to copy and rebuild a drive before a failure occurs.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern data storage systems frequently employ hundreds or even thousands of HDDs (Hard-Disk Drives) interconnected by high-speed busses such as Serial Attached SCSI (SAS) or other busses. To improve both the reliability and performance of these components they are often grouped together into RAID (Redundant Array of Inexpensive Disks) configurations. RAID improves both reliability and performance by spreading data across multiple disks using a method known as "striping." Disk striping divides a set of data (e.g., file, folder, partition, etc.) and spreads the data blocks across multiple storage devices so that each stripe consists of the data divided across a set of disks. A "stripe unit" refers to that portion of a stripe that resides on an individual drive; for example a stripe spanning 14 drives consists of 14 stripe-units, one per drive. The number of different drives depends on the configuration of the storage system, and the requirements of the applications. For example, in a Data Domain OS storage system (DDOS), such as that provided by EMC Corporation, the backup server can write to upwards of 14 RAID disks at a time. Given the large number of disks involved in enterprise storage systems, and tight design and manufacturing tolerances required for constantly improved disk devices, it is inevitable that disk failures occasionally occur. Any type of disk or disk array failure can cause data loss or corruption, and in deployed and running systems this can be very costly and even catastrophic for businesses or organizations. With respect to rebuild operations, RAID striping provides some improvement in rebuild times but generally a small percentage.

A RAID system protects against data loss by using a parity scheme that allows data to be reconstructed when a disk has failed. Rebuilds typically involve identifying and removing the failed or defective disk, switching to a spare disk (or swapping a new disk in its place for systems without a spare) and then performing data restores using the appropriate RAID procedure based on the RAID level (currently, RAID 0 to 6). RAID rebuild times can be a day or more and disk manufacturers are using more esoteric techniques that may decrease the reliability of disks. For typical schemes today, a RAID 5 can suffer one disk failure with no data loss while a RAID 6 can protect against two disks failing at the same time. Most systems use one or more spare drives in the system to minimize the repair time. However, just copying a drive can take around three hours per terabyte on an idle system. In general, a rebuild (repair) time varies based on the mechanisms used. It can be nearly as fast as a copy operation or take a multiple of that time. That means it can take days to rebuild today's 8 TB drives. The availability of a system depends on fast repair (rebuild) times since it is relying on another drive not failing during that rebuild time. If the repair and rebuild times are held constant, the availability if a RAID array generally decreases exponentially with increasing drive size. This premise assumes that drive failures are independent, however, drive failures are often not independent because of design or manufacturing flaws in disk drives and because RAID arrays often use drives that are both from the same vendor and were manufactured around the same time. This fact produces failure conditions that are somewhat predictable. Present disk rebuild processes, however, do not adequately or effectively use this information to minimize or achieve near zero rebuild times.

What is needed, therefore is RAID disk rebuild process that uses early indicators of possible failure to copy/rebuild a drive and keep it in sync before failure. What is further needed is an effective zero rebuild time for failed drives in large-scale or enterprise data storage systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of EMC Corporation of Hopkinton, Mass.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
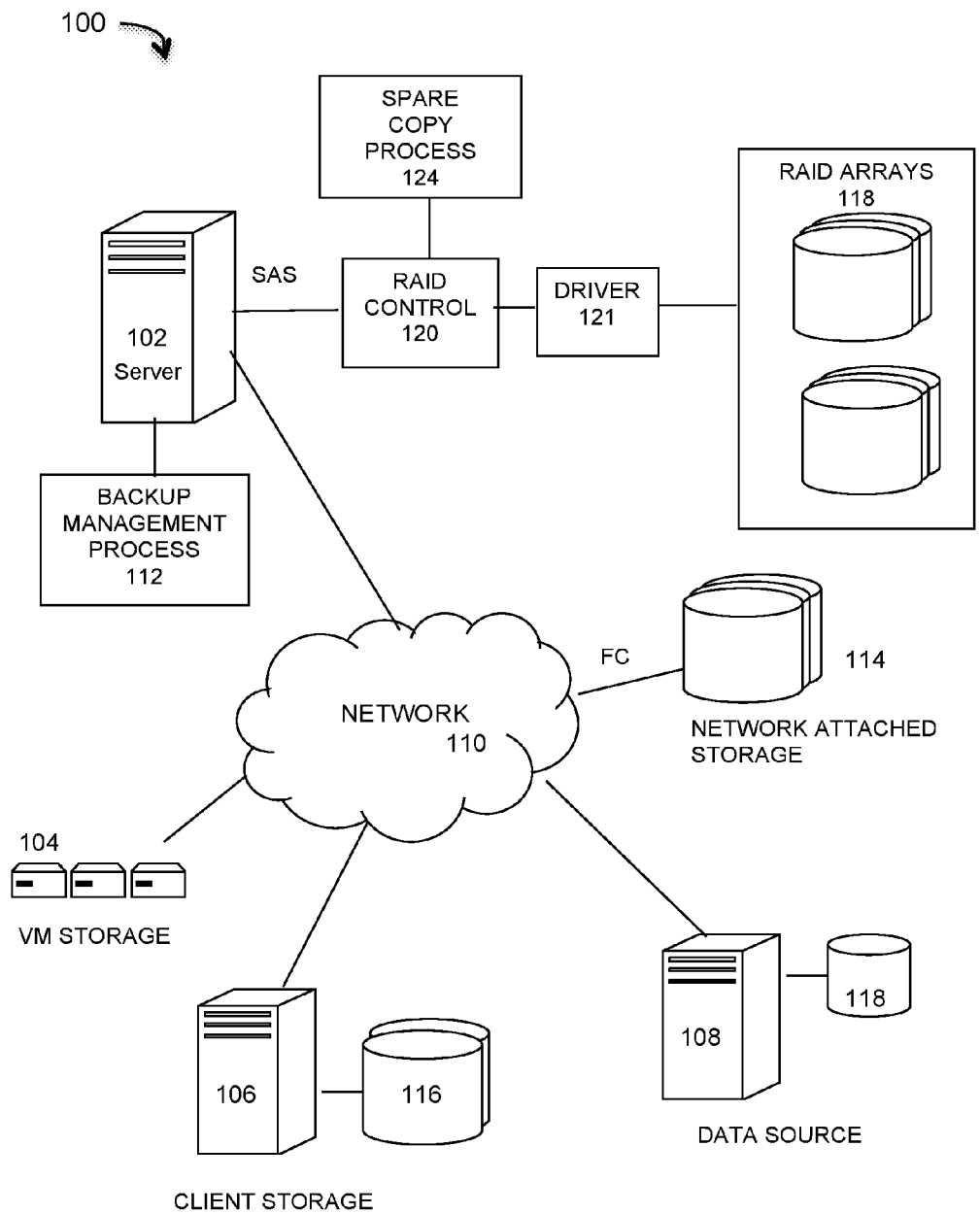
FIG. 1 illustrates a data storage system that implements one or more embodiments of an early RAID rebuild process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup related processes executed in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a processing component in or associated with a server computer (e.g., backup server) or memory controller that provides very fast (near-zero time) rebuild time for disks in a RAID storage system by using certain predictive information to initiate disk copies to one or more spare disks so that in case of failure of the original disk, RAID rebuilds can be performed using the spare disk, and thus occur nearly instantaneously.

FIG. 1 illustrates a data storage system 100 that implements one or more embodiments of a topology aware I/O scheduler for data storage arrays, under some embodiments. As shown in system 100, one or more client computers 106 and 108 execute one or more applications that generate read/write requests to create and process data stored on data storage devices on the network. The client computer(s) may access the data storage devices through a network 110, such as the Internet, cloud, WAN, LAN, and other types of networks.

In system 100, a backup or storage server 102 executes a backup management process 112 that coordinates or manages the backup of data from one or more data sources (e.g., clients to the storage devices. The storage devices may serve as network storage devices or target storage devices for data backed up in large-scale data backup operations. In an embodiment, the server 102 may be coupled to an array or arrays of disks or memory devices and may be arranged in the form of multi-memory shelves, such as in enterprise or large-scale data storage facilities. This is illustrated in system 100 as RAID array 118, which shows a number of HDD shelves or arrays that each comprise a number of individual disks. Any practical number and arrangement of disks and shelves may be provided, and aspects of the rebuild process may be scaled to work with single storage devices, medium size arrays, or large-scale mixed media arrays. As an example, a present embodiment may control a RAID array comprising around 40 to 50 shelves with around 15 4-Terabyte or 8-Terabyte drives, though any other configuration is possible. Communication between server 102 and RAID array 118 may be over a SAS network, as shown, or any other appropriate network link.

Although embodiments may be described with respect to RAID systems, embodiments are not so limited and other disk drive-based storage systems that may be controlled by the process include network attached storage (NAS) array 114 which is coupled to server 102 through network 110 or a Fibre Channel (FC) link, Virtual Machine (VM) storage 104, or local client storage arrays 116.

The storage server and client computers may be coupled directly or indirectly to each other through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data stored, accessed or processed by the client computers and the applications may be any appropriate type of data, such as database data that is part of a database management system. In this case, the data may reside on one or more storage devices and may be stored in the database in a variety of formats (e.g., XML databases, relational (RDMS) databases and so on). The data generated or sourced by system 100 is generally stored in any number of persistent storage locations and devices. The storage server 102 executes a backup process that causes or facilitates the backup of the application data the storage devices of the network, which may at least be partially implemented through RAID components of array 118. The storage server 108 may implement certain backup processes such as de-duplication processes. In an embodiment the storage server is embodied as a data domain replicator (DDR) device provided by EMC Corporation of Hopkinton, Mass. In an embodiment in which the storage systems is a DDR system, the RAID array is typically a RAID-6 array. Other embodiments may utilize other RAID systems, such as any of RAID-0 to RAID-5.

As shown in FIG. 1, the backup server 102 and certain routines of the backup management process 112 communicate to the RAID disks 112 through a RAID controller 120. The raid controller 120 is a hardware device or software program used to manage the hard disk drives 118 in the RAID array(s) so that they work as a logical unit. The RAID controller typically offers a level of abstraction between the server 102 operating system (OS) and the physical drives 118; it presents groups to applications and OS processes as logical units for which data protection schemes within the specific RAID protocol can be defined. In an embodiment in which the RAID system is hardware-based, RAID controller 120 may be a hardware circuit in or coupled to the server 102, or it more typically may be a PCI or PCI Express (PCIe) card that is installed on or near the disk shelves, and which is designed to support a specific drive format such as SATA or SCSI. For a software-based system, the RAID controller 120 may be software-only, using the hardware resources of the host system. A separate or integrated driver function 121 may also be used in certain software or firmware-based RAID controllers to interface with the HDDs of the RAID array.

For the embodiment of system 100, a spare copy (or backup) process 124 is executed by at least one of the RAID controller 120 or the backup server 102. This process detects certain error conditions occurring in one or more of the disks of the RAID array 118, and institutes a copy operation to one or more spare disks in the array. Copy process 124 uses predictors to trigger a disk copy so that in the event that drive does fail, the RAID rebuild can be performed nearly instantaneously, rather than over the long time intervals (e.g., hours or days) that is currently required.

Figure 2:
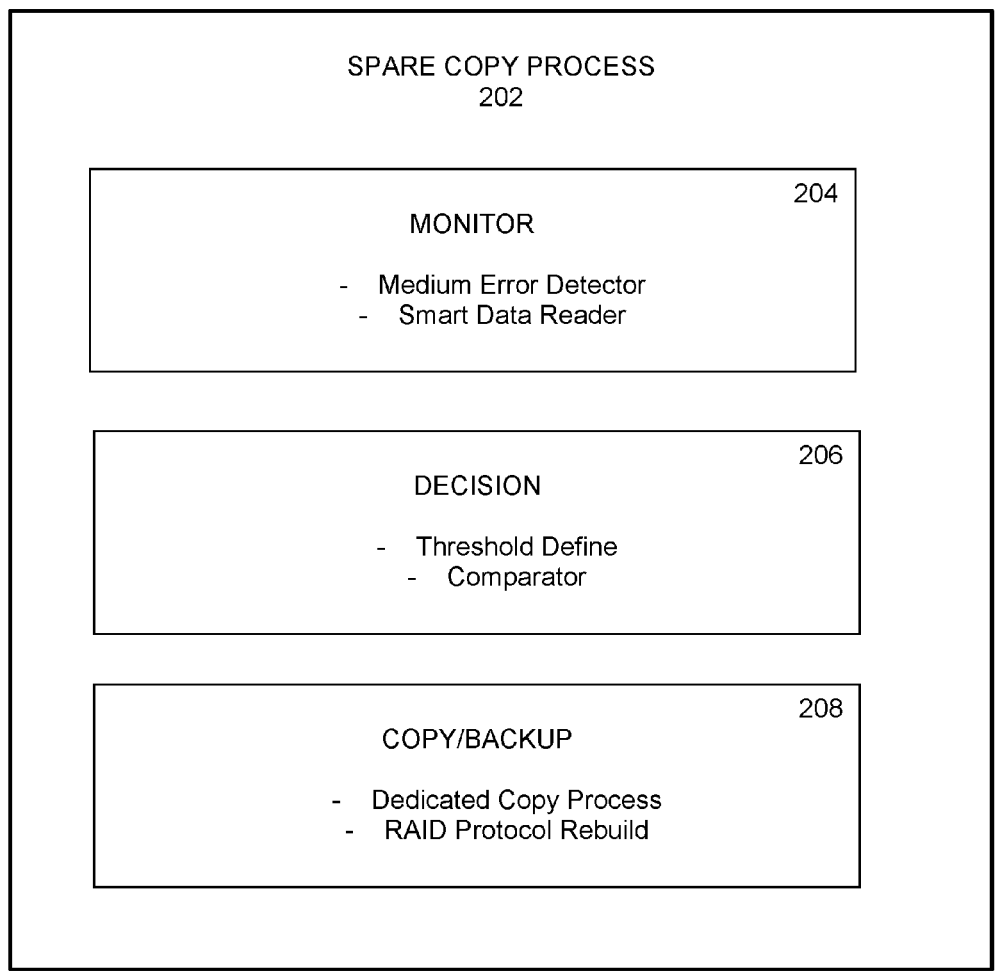
FIG. 2 is a block diagram that shows certain functions of a spare drive copy process under some embodiments.

FIG. 2 is a block diagram that shows certain functions of a spare drive copy process under some embodiments. The process 202 includes certain components, program functions, routines or sub-routines that perform specific tasks within the overall process. A monitor component 204 monitors the disks within the RAID arrays and detects certain defined error conditions that might indicate potential disk failure. A decision component 206 compares the detected error conditions against one or more defined threshold or trigger conditions to initiate a copy process of the potentially failing disk. A copy/backup component 208 performs the backup of the potentially failing disk to a spare disk to provide a basis for near instantaneous disk recovery under the appropriate RAID protocol in the event of failure of the original disk. Structural and operating details for each of these components will be described in greater detail below.

It should be noted that any or each of the components 204 to 206 and associated sub-components may be implemented as software processes (executable programs), hardware components (circuits and devices), or any combination thereof (e.g., programmable arrays, DSPs, firmware components, etc.). It should also be noted some or a combination of these components may reside or be embedded within, or executed by either or both of the server computer 102 and RAID controller 120.

Spare Copy Process

Figure 3:
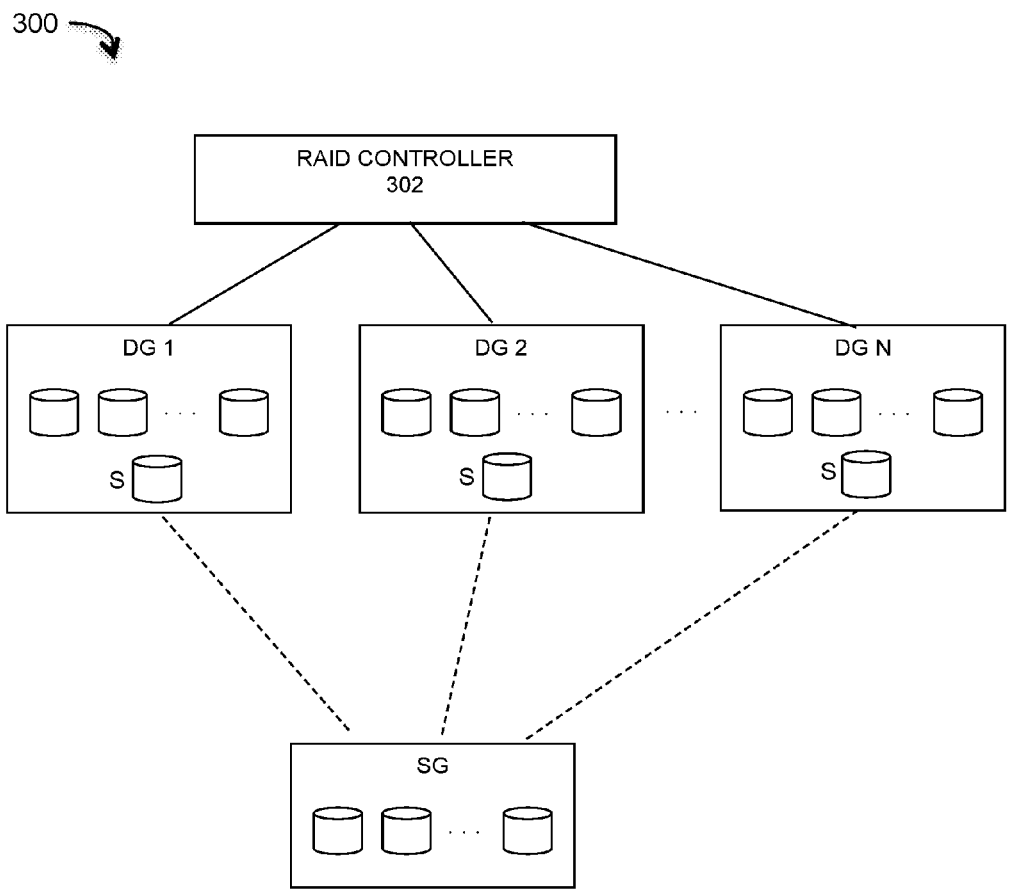
FIG. 3 illustrates disk arrays with spare disks that may be used under some embodiments.

The spare copy process utilizes one or more spare disks associated with individual RAID arrays or disk groups. FIG. 3 illustrates disk arrays with spare disks that may be used under some embodiments. As shown in FIG. 3, system 300 comprises a RAID storage system with a number N disk groups (DG) denoted DG_1, DG_2, up to DG_N. Each disk group may represent an array, sub-array, or collection of disks that are used together to form a logical unit under certain RAID (or other) disk striping protocols, and each array contains a number (e.g., 15) of individual high capacity disk drives (e.g., 4 to 10 TB) for data storage, along with one or more parity or check disks. In an embodiment, a number of spare disks are included within or associated with each disk group. Thus, for the embodiment shown in FIG. 3, each disk group DG can have one or more spare disks, S, for use by the spare disk copy process 202. Each spare may be dedicated to a respective disk group in a dedicated spare system. Alternatively, a shared spare disk system may be used in which the spare disk or disks are shared among different disk groups. As shown in FIG. 3, a spare disk group (SG) may house a number of spare disks (e.g., one or two spares per DG), and be provided with an interface to each of the disk groups. Any combination of dedicated or spare disks may be used under various embodiments of the spare copy process depending on system configuration and constraints.

Figure 4A:
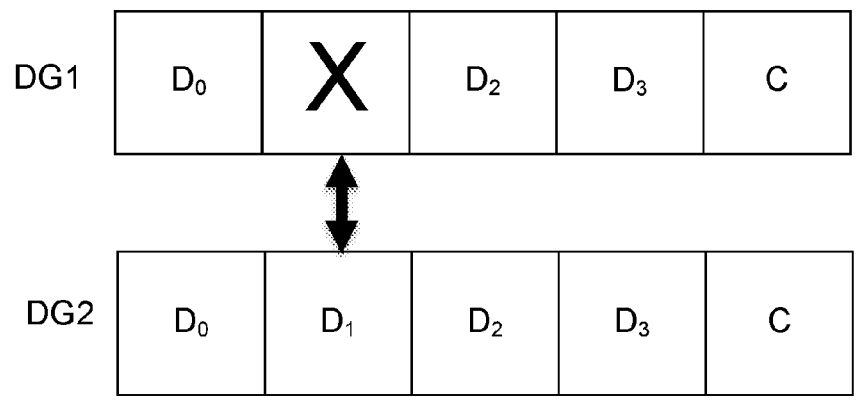
FIG. 4A illustrates a RAID rebuild process under some embodiments.
Figure 4B:
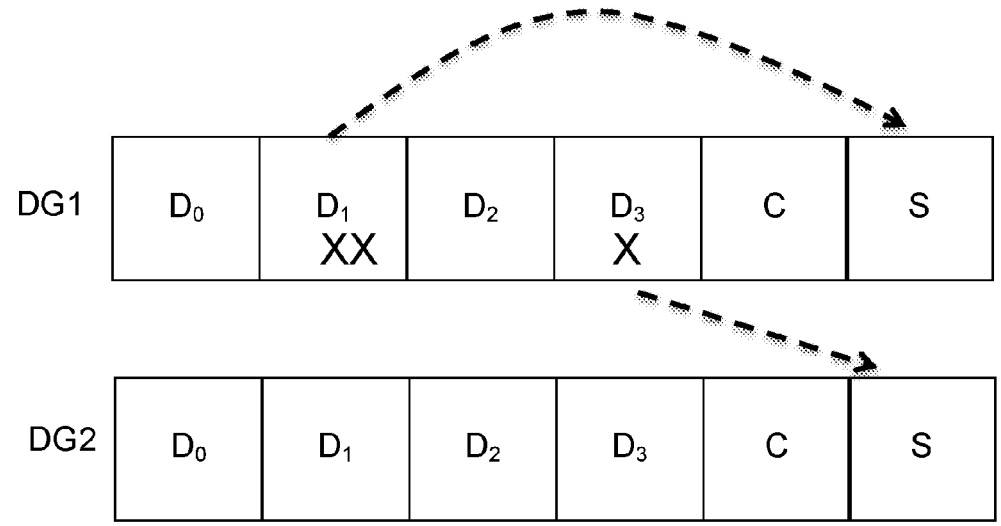
FIG. 4B illustrates an operation of the spare copy process in an RAID system under some embodiments.

FIGS. 4A and 4B illustrate an operation of the spare copy process in an RAID system under some embodiments. As shown in these FIGS., an example portion of a RAID array has two disk groups DG1 and DG2, each having four data disks $D_0$ to $D_3$) and a check (or parity) disk C. Under proper operation when all data disks (D) are operating normally, the spare disk is idle and unused. During actual deployment, it is normal for a RAID system to experience some degree of disk failures that lead to data corruption and loss. In fact, a failure rate in the range of 1% per year of all disks in a large-scale storage system is typical. Though this overall percentage may seem relatively low, in a very large-scale deployment of tens of thousands of disks, a 1 percent failure means multiples hundreds of disks will fail. Given the high density of present disks, each disk failure can corrupt or lose very large amounts of data. In general, the redundancies and parity mechanisms employed by the RAID architectures and protocols provide the means to recover from such failures. As shown in FIG. 4A, failure of a disk, $D_1$, in one disk group (DG1) results in a rebuild using the redundant disk $D_1$ from a different disk group (DG2) using the processes included in RAID controller 120. However, as stated previously, recovery and rebuild processes under RAID protocols, though robust, may take excessively long periods of time (e.g., one or more days) for current high capacity drives and systems, which can be very costly for many enterprise scenarios.

In an embodiment, the spare copy process 124 included or associated with RAID controller 120 utilizes a prediction process and spare disk copy operation to eliminate the long RAID rebuild times. For this embodiment, each disk group also has a spare disk S, which may be a single spare disk or multiple spare disks, and which may be dedicated exclusively to a disk group or shared between or among multiple disk groups, as shown in FIG. 4B. During operation of the spare copy process, the data and check disks are continuously monitored by monitor component 204 to detect the presence of error or pre-failure conditions that indicate the onset or likelihood of eventual disk failure. In general, a certain number of errors will occur before a spare copy operation is initiated. In the event of a single catastrophic error, no pre-indication was available and the failed disk will be recovered according to the normal RAID protocol, as shown in FIG. 4A. However, if such indicators are available, a count is kept and when a defined threshold is reached, the contents of the failing disk will be copied to the spare disk along with all future operations to that disk, through copy/backup operation 208. In this way, the spare disk acts as a current backup of the failing disk, and is ready to be used in place of the failing disk if and when it eventually fails. If the copy is complete, then it is used in place of the failed drive. If the copy is incomplete, the normal RAID rebuild algorithms are used from that point. In this manner, there is no downtime associated with the RAID rebuild, since the spare disk essentially takes over from the failed disk immediately upon and, in fact, prior to the disk failure. Once the RAID rebuild of the failed disk is complete, the spare disk can be returned to a clean, idle state to be ready for the next spare copy process.

For the example of FIG. 4B, disk 1 ($D_1$) of disk group 1 (DG1) is showing signs of impending failure through the occurrence of two errors or failure indicators, as denoted by the two X's. If the threshold set by the system is two, then the process will initiate a copy of $D_1$ to the DG1 spare disk, S. After initiation of the copy process 208, future data writes to $D_1$ will also be written to disk S so that S is kept up-to-date with $D_1$ until it fails. Read operations may still be made from $D_1$ until failure. If another disk, e.g., $D_3$ starts to show failure indications, the disk S may be used to backup this disk instead. Whichever disk first reaches the threshold or a pre-defined rate of failure indicators will be copied to disk S. If disk S is currently used to backup a first disk but a second disk is failing more rapidly, disk S will be cleared and be used to copy the second disk instead. Once the second disk is failed and replaced, the replaced disk becomes disk S and, disk S can be re-dedicated to the first disk, unless a third disk starts to fail more rapidly. This hierarchy and protocol of spare disk copying is used throughout each disk group and depends on the pre-defined threshold and the comparison operation performed in the decision component 206. As shown in FIG. 2, the drive with the failure indicators is copied using the same software that does the RAID rebuild using a dedicated copy process. It is also possible to use the RAID rebuild algorithm, although this is generally not as efficient.

For the example of FIG. 4B, a single disk S is available to each disk group. In an embodiment, multiple spares may be available depending on system capacity and/or cost constraints or spare disks from other disk groups can be made available to each disk group. Thus, as shown in FIG. 4B, failing disk $D_3$ from DG1 could be copied to the disk S in DG2 if this configuration is available. In the case of multiple spares either within one disk group or between disk groups, progressively failing disks could be copied to each respective spare until the number of spares is exceeded, in which case, the hierarchy based on indicator count and/or count rate is used to determine the order of copying to the spare disks.

As implied above, disk failures can often occur in parallel, such as when a batch of drives starts to fail around the same time due to age or specific manufacturing defects that affect a number of drives. If a second drive has correctable errors that might cause it to become a candidate for the spare copy process, there are a few options. If the system is made up of multiple RAID arrays, there may already be a mechanism of spare sharing or pooling. In that case, a spare from one array may be used by another whose spare is unavailable, as described above. If the second drive's error count is higher, the spare can be switched to this new drive, and a hysteresis can be used to prevent the spare from switching back and forth. A drive that is already copied to the spare can be replaced early, since multiple drives in the same array that have enough errors to trigger this problem could be an indicator of a systemic problem that is affecting multiple drives. In all of these cases, a drive that has a higher likelihood of failing has already been copied to a spare and the near-instantaneous rebuild time is the same.

It should be noted that FIGS. 4A and 4B represent an example configuration or small portion of a large RAID system, and the number of disks and disk groups can be much larger than shown.

Failure Indicators

In general, most disk failures are not catastrophic and often have localized errors or conditions that can be predictors of possible or eventual failure. The spare copy process 124 uses these predictors to trigger a copy to a spare disk so that in the event the original drive does fail, the RAID rebuild in nearly instantaneous. This scheme can effectively bring the rebuild time to near zero for many drive failures, which significantly increases the availability of disks within the entire RAID system. Problems that cause disks to fail or that force system administrators to fail a disk by pulling it out of service are often related to production defects. Such defects may be associated with certain design parameters, such as stresses related to increased speed and/or density in modern disks, or problems with certain production conditions (e.g., problematic manufacturing plants or manufacturing schedules, etc.). Empirical data indicates that disk failures and problems often show up at around the same age for disks depending on make, model, and production lot. This provides a basis for analyzing patterns of failures to deduce when and which disk devices may be likely to fail within storage arrays. The spare copy process 124 utilizes these patterns to provide indications of pre-failure conditions that allow a spare disk to be immediately used as backup for a potentially failing disk.

Disk failures are often not catastrophic. In many cases, rather than not being able to access data from a disk, the driver software may decide to fail a drive based on the number or interval of soft errors. A soft error is one that can be detected and, as needed, repaired by the software. The driver software often has algorithms to declare a drive as failed because these failures may have other side effects in a system that could trigger other problems. At that point, during normal RAID operation, a rebuild is started. A full RAID rebuild uses an algorithm that requires reading data from all of the drives and recalculating the data that existed on the failed drive. That data is then written to a redundant target drive (as shown in FIG. 4A). If most of the data on the drive is accessible, the rebuild may be handled by just copying data from the failed drive and doing the calculations only on sectors that are inaccessible from the failed drive.

As stated above, the spare copy process provides a way to use possible early failure indicators to copy/rebuild a drive and keep it in sync before failure. This, in turn provides an effective "zero rebuild" time for many failed drives, including those that are failed by the driver software since improvements to rebuild times are getting critical as drive sizes increase but rebuild times do not change significantly.

In general, there are two well-known error conditions reported by a drive that can predict that a drive may be heading towards a failure; medium errors and the Re-Allocated Sector (RAS) count. A medium error is one where the drive is not able to return good data, even after having gone through various recovery algorithms. A Re-Allocated sector is one that the drive has determined cannot be used and another spare sector is used in its place, with the disk drive keeping track of the "indirection". Often times the sector that caused the Medium Error is reallocated by the drive itself. For example, writes to sector 100 may be written to sector 100001 automatically by the drive itself if it determines that sector 100 is corrupted.

Several known predictors of hard disk electromechanical failure include reallocated sectors, reallocated event counts, and current pending sector counts. In an embodiment, medium errors are also used as a predictor of disk failure rates. When a physical problem is encountered when trying to read data from a hard disk, and multiple read attempts fail, the hard disk experiences a medium error. Medium errors (ME) can be classified as a "real medium error" or a failure related to the head. A real medium failure indicates a marginal disk platter or a loss of proper magnetic properties. A failure related to the head occurs when the read/write header has deteriorated. Conditions that may cause such an error are external conditions (e.g. dust) physically harming the disk head, imprecision in the physical write location, or improper alignment. A sudden power failure may also cause a medium error, but this is typically limited to one sector in most cases. Most medium errors are head failures or a defect on the magnetic medium.

Medium errors are typically reported by a drive as they occur. In contrast, RAS counts are generally maintained in the smart data area of a drive. Thus, to monitor the occurrence of RAS events, a register or memory location within the drive must be read. To maintain an accurate count of these RAS events, the read period must be sufficiently high. In an embodiment, the monitor component 204 includes a detector to detect the medium errors, and a smart data reader component to periodically read the smart data area of each disk. A count is maintained for each type of indicator (ME and RAS) for use by the decision component 206.

As shown in FIG. 206, the decision component 206 includes a threshold definition process and a comparator that compares the indicator counts to the threshold. The threshold and comparator process may use any appropriate formulation of counts and comparisons, depending on specific implementation details. For example, a fixed number of combined RAS and ME errors per drive may be defined as the threshold. As a simple example, a threshold may be set to five (5) indicators such that upon the occurrence of a fifth RAS or ME error, the spare copy process 208 is initiated. Thus, in this case the comparison process may be expressed as:

If $RAS+ME \geq T_1$, then initiate copy.

In this case, the threshold, $T_1$, can be a simple integer, such as 5, or any other appropriate number.

In some cases, a certain type of error may be deemed more important than the other. For example, medium errors are often quite serious, and the occurrence of multiple ME's might indicate a more serious condition than multiple RAS events. In this case, the errors can be weighted so that the comparison becomes:

If $w_1 RAS + w_2 ME > T_2$, then initiate copy.

In this case, the respective weight values $w_1$ and $w_2$ can be set to reflect the relative seriousness of the indicators.

In another embodiment, the rate of indicators may be used to decide that a certain disk should be copied over another drive, even if the other drive has more indicators. This may be the case where a series of rapid occurrences of an error may indicate that a device is certain to fail quite soon. In this case, a rate factor can be introduced, such as:

If $R_1 w_1 RAS + R_2 w_2 ME > T_3$, then initiate copy.

In this case, the respective rate values $R_1$ and $R_2$ can be set to reflect dangerous rates of failures for each type of indicator. The monitor would include a timer to keep a timed count of each type of occurrence, or an analyzer for the history log of the RAS and ME indicators.

In addition to the (weighted) indicator counts and rates, the decision component 206 can be configured to analyze certain data and configuration information. These can include system configuration, such as number of spares such that a system with more spares may be forced to perform spare copy operations more frequently, i.e., the threshold may be lowered in this case. Hysteresis may also be used by the decision component such that certain past history is used to help predict the potential for future failure.

It should be noted that the RAS and ME events represent two possible types of error indicators that may be used by the process 124, and embodiments are not so limited. Other errors, error conditions, warnings, or flagged or detectable events that are generated by the drives or that are perceivable on the drives and that affect reliability may be used to provide an indication of potential disk failure. These data items can be quantized and normalized as required by the system to be integrated with the RAS and ME data or even substituted for one or both of these data items, for use in the comparison process to trigger the spare copy process.

Figure 5:
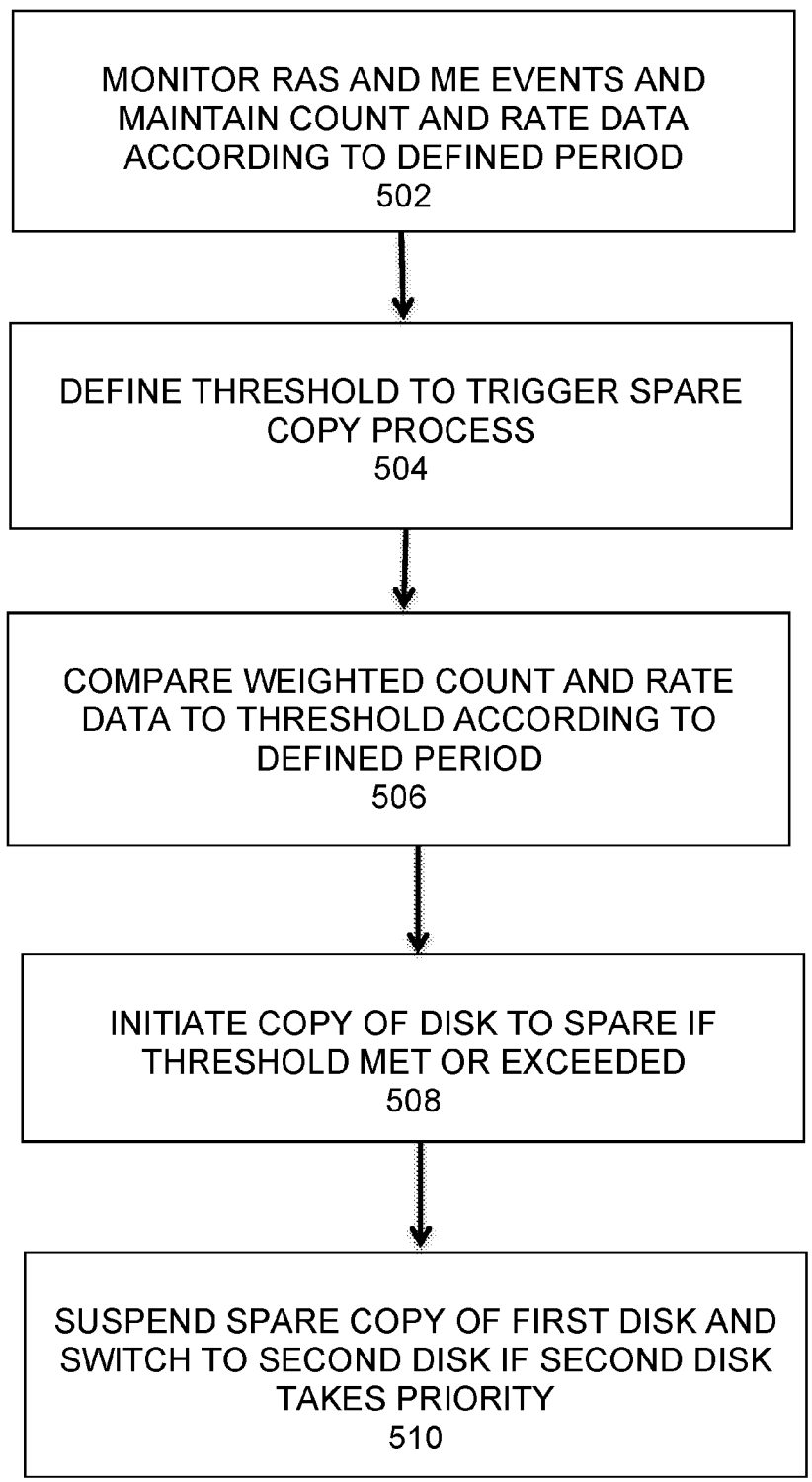
FIG. 5 is a flowchart that illustrates a method of performing a spare disk copy for RAID systems under some embodiments.

FIG. 5 is a flowchart that illustrates a method of performing a spare disk copy in the event of failure indicators for RAID systems under some embodiments. As shown in FIG. 5, the process starts in block 502 with the monitor component monitoring RAS and ME events through sub-processes that detect ME events and read the drive smart data area storing the RAS data. The frequency of the RAS read operations can be set by the system, and may be of any appropriate value, such as once per hour or similar. The monitor component also maintains a count of the RAS and ME events, as well as a measure of the rate of event occurrences. As shown in block 504, a threshold value is defined within the system to represent a trigger point at which the copy to the spare disk is initiated. The decision component continuously compares the count rate (optionally weighted) and rate data (also optional) to the threshold to determined if the threshold is met or exceeded by any of the drives. The frequency of the comparison operation can be set as a fixed parameter within the system depending on system capabilities and constraints. If the threshold is met or exceeded by a disk (depending on whether the trigger condition is ≥ or >) then the spare copy process is initiated for that disk. In the event that a second disk exhibits indicators in excess of the threshold such as by a greater number or higher rate, the second disk may pre-empt the copying of the first disk and take priority to have its contents copied to the spare disk instead.

Figure 6:
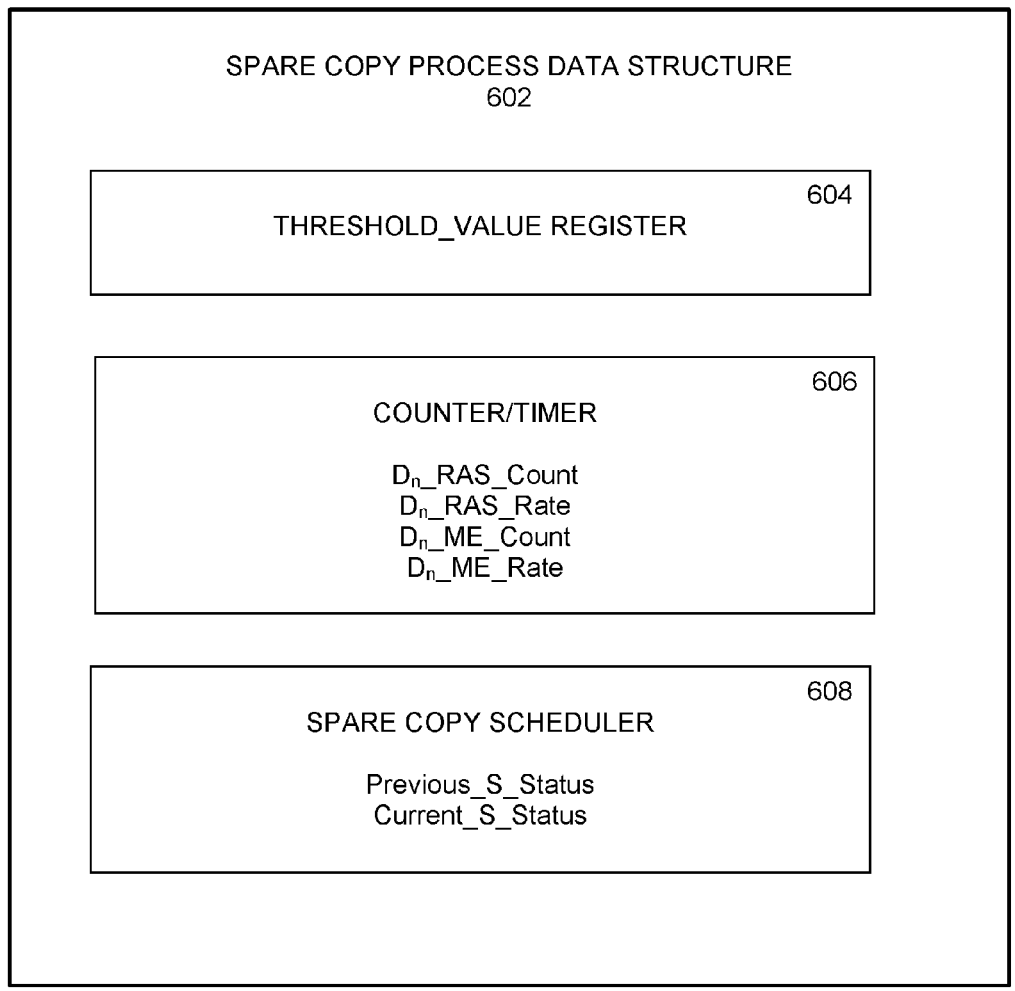
FIG. 6 illustrates an example data structure data elements of the spare copy process under some embodiments.

In an embodiment, certain parameters and data elements are maintained by and for the spare copy process 124. FIG. 6 illustrates a data structure for this process under some embodiments. As shown in FIG. 6, a first register 604 may store the threshold value or values for the various comparison algorithms. As described above, different thresholds $T_1$ to $T_n$ may be defined depending on whether the comparison process uses a simple indicator count, a weighted indicator count, a rate-based weighted indicator count, and so on. A second register or register array 606 may store certain counter and timer values. For each disk $D_n$ in an N-disk array or group DG, the occurrence count and rate are stored for each of the monitored events, such as RAS and ME events. Thus, each disk may have storage locations for a RAS Count value, a RAS Rate value, an ME Count value, and ME Rate value, for example.

The data structure 602 may also include a spare copy scheduler element to track the status of the spare disk or disks. During the spare copy process, an individual spare disk S may go through certain disk identities depending on which disk or disks are being copied or pre-emptied by other disks. For example, the status of the spare disk may look like, for example:

IDLE→$S_1$→$S_3$→$S_1$→ . . . →IDLE for the case where the spare disk first backs up disk 1, which is pre-empted by disk 3, and then released to backup disk 1 again. This past and current status can be stored in data structure 608 to help maintain the status of the spare disk, and to inform any hysteresis analysis that can be used to prevent S from switching too frequently among disks that are exhibiting error indicators.

FIG. 6 is intended to be an example of a possible data structure for the spare copy process under some embodiments, and embodiments are not so limited. Any appropriate data structure for the system and/or for each of the individual data elements may be used depending on system configuration and implementation.

Embodiments of the spare copy process described herein provide a method whereby, rather than waiting for a drive to fail, or be failed, the driver software can use a low threshold to trigger a drive copy to the spare. Rather than taking that drive out of service, any data written to the suspect drive, is also written to the spare, so the data on the spare matches the data on that suspect drive. If the drive fails, the spare is immediately available with the correct data. So the repair (rebuilt) time can be on the order of seconds rather than hours, or even days.

Certain implementations of the spare copy process may incur a performance impact. In general, however, this is very small since writing to N+1 drives rather than N has minimal impact to latency since, when writing to N drives, the seek times are already near worst-case (e.g., for RAID arrays of six or more drives). There is the possible impact of the additional bandwidth used, but again this is just 1/N and, often, the bandwidth to the array is not the limiting factor of performance.

Embodiments are generally described herein with respect to RAID storage systems. Such systems may employ any number of RAID levels with respect to fault tolerance and redundancy. Nominally, a RAID 6 level is used, though any other RAID level (e.g., RAID0 to RAID5, or other) may be used. Moreover, the data storage array may be a non-RAID array, and may be any array of two or more storage devices across with stripes of data are stored.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of minimizing rebuild times within a large-scale data storage system comprising:
   maintaining a spare disk for a plurality of disks within a disk array;
   monitoring the plurality of disks for occurrence of one or more pre-failure indicators;
   maintaining, for each disk, a count of the occurrences of the one or more pre-failure indicators;
   comparing the count for each disk to a defined threshold value;
   copying a first disk and mirroring write operations to the first disk to the spare disk if the count for the first disk exceeds the threshold; and
   switching from copying to the spare disk from the first disk to copying to the spare disk from a second disk if the count for the second disk exceeds the count for the first disk.

2. The method of claim 1 wherein the one or more pre-failure indicators comprise a medium error (ME) event and a re-allocated sector (RAS) occurrence.

3. The method of claim 2 wherein the monitoring step comprises detecting reported ME events as they occur, and checking a smart data area of the first disk storing a count of the RAS occurrences.

4. The method of claim 3 wherein the maintaining step maintains a weighted count of the occurrences of the ME events and the RAS occurrences, and wherein a relative weight of the ME events versus the RAS occurrences is defined by the absolute value of weights $w_1$ and $w_2$ assigned respectively to the ME events and RAS occurrences.

5. The method of claim 3 further comprising maintaining for the count for each disk, a rate factor for each of the ME events and RAS occurrences calculated for measured time intervals between each ME event and RAS occurrence.

6. The method of claim 1 wherein the array of storage devices comprises a RAID array.

7. The method of claim 4 wherein the RAID array conforms to one of a RAID5 or a RAID6 system.

8. The method of claim 7 wherein the copying step uses one of a dedicated copy process copying data blocks from the first disk to the spare disk, or a rebuild procedure defined by the RAID system.

9. A system for minimizing rebuild times within a RAID system, comprising:
   a spare disk maintained for a plurality of disks within a disk array of the RAID system;
   a monitor component monitoring the plurality of disks for occurrence of one or more pre-failure indicators; a counter maintaining, for each disk, a count of the occurrences of the one or more pre-failure indicators;
   a comparator comparing the count for each disk to a defined threshold value; and
   a backup component copying a first disk and mirroring write operations to the first disk to the spare disk if the count for the first disk exceeds the threshold and switching from copying to the spare disk from the first disk to copying to the spare disk from a second disk if the count for the second disk exceeds the count for the first disk.

10. The system of claim 9 wherein the one or more pre-failure indicators comprise a medium error (ME) event and a re-allocated sector (RAS) occurrence.

11. The system of claim 10 further comprising a detector component detecting reported ME events as they occur, and checking a smart data area of the first disk storing a count of the RAS occurrences.

12. The system of claim 11 wherein counter maintains a weighted count of the occurrences of the ME events and the RAS occurrences, and wherein a relative weight of the ME events versus the RAS occurrences is defined by the absolute value of weights $w_1$ and $w_2$ assigned respectively to the ME events and RAS occurrences.

13. The system of claim 12 wherein the counter maintains for the count for each disk, a rate factor for each of the ME events and RAS occurrences calculated for measured time intervals between each ME event and RAS occurrence.

14. The system of claim 9 wherein RAID system comprises one of a RAID5 system or a RAID6 system.

15. The system of claim 14 wherein the backup component uses one of a dedicated copy process copying data blocks from the first disk to the spare disk, or a rebuild procedure defined by the RAID system.

16. A non-transitory computer-readable medium having stored thereon a program containing executable instructions causing a processor-based computer to perform, within a disk storage system having disk arrays with at least one associated spare disk, a method comprising:
  monitoring the plurality of disks for occurrence of one or more pre-failure indicators;
  maintaining, for each disk, a count of the occurrences of the one or more pre-failure indicators;
  comparing the count for each disk to a defined threshold value; copying a first disk and mirroring write operations to the first disk to the spare disk if the count for the first disk exceeds the threshold; and
  switching from copying to the spare disk from the first disk to copying to the spare disk from a second disk if the count for the second disk exceeds the count for the first disk.

* * * * *